(12) United States Patent
Lusilao-Zodi et al.

(10) Patent No.: US 8,873,416 B2
(45) Date of Patent: Oct. 28, 2014

(54) SYSTEM AND METHOD FOR ESTIMATING ROUND-TRIP TIME IN TELECOMMUNICATION NETWORKS

(75) Inventors: Guy-Alain Lusilao-Zodi, Bergvliet (ZA); Norman Morrison, Camps Bay (ZA)

(73) Assignee: University of Cape Town (ZA)

( * ) Notice: Subject to any disclaimer, the term of this patent is extended or adjusted under 35 U.S.C. 154(b) by 194 days.

(21) Appl. No.: 13/579,253

(22) PCT Filed: Feb. 25, 2011

(86) PCT No.: PCT/IB2011/000393
§ 371 (c)(1),
(2), (4) Date: Aug. 15, 2012

(87) PCT Pub. No.: WO2011/104620
PCT Pub. Date: Sep. 1, 2011

(65) Prior Publication Data
US 2012/0307675 A1 Dec. 6, 2012

(30) Foreign Application Priority Data
Feb. 26, 2010 (ZA) .................................. 2010/01400

(51) Int. Cl.
*H04L 12/26* (2006.01)
*H04J 1/16* (2006.01)
*H04L 12/841* (2013.01)
(52) U.S. Cl.
CPC .......... *H04L 43/0864* (2013.01); *H04L 47/283* (2013.01)
USPC ................. 370/252; 375/94; 375/95; 375/99; 375/75; 375/101; 714/746; 714/747; 714/748; 370/236; 370/249; 370/519; 370/503; 370/465

(58) Field of Classification Search
CPC .......................... H04L 43/0864; H04L 47/283
USPC .......................................... 370/252, 254, 389
See application file for complete search history.

(56) References Cited

U.S. PATENT DOCUMENTS 4,862,483 A * 8/1989 Clark ............................ 375/341
5,005,188 A * 4/1991 Clark ............................ 375/341
(Continued)

OTHER PUBLICATIONS

Jacobson, Congestion Avoidance and Control, Proc. ACM SIGCOMM '88, vol. 18, No. 4, Aug. 1988, pp. 314-329 Section 2.*
(Continued)

*Primary Examiner* — Andrew Lai
*Assistant Examiner* — Mahmudul Hasan
(74) *Attorney, Agent, or Firm* — Lowe Graham Jones PLLC

(57) ABSTRACT

A method for estimating round-trip time (RTT) values for data packets travelling in a telecommunication network is disclosed. During a first time interval (206) which begins with the start of a data transmission, estimated RTT values (14) are generated by filtering a periodic sequence of RTT samples (12) with a self-initializing expanding memory polynomial (EMP) filter (16) and, after a first switch-over time at the end of the first time interval, the estimated RTT values are generated by filtering the RTT samples with a fading memory polynomial (FMP) filter (18). The first switch-over time is determined by comparing an FMP estimation error and an EMP estimation error, where the FMP estimation error is the difference between an output of the FMP filter and the RTT samples, and the EMP estimation error is the difference between an output of the EMP filter and the RTT samples, and triggering the first switch-over time when the FMP estimation error becomes equal to or less than the EMP estimation error.

14 Claims, 3 Drawing Sheets

(56) References Cited

U.S. PATENT DOCUMENTS

| | | | |
|---|---|---|---|
| 7,574,726 B2* | 8/2009 | Zhang et al. | 725/95 |
| 8,031,627 B2* | 10/2011 | Ee et al. | 370/252 |
| 2007/0115846 A1* | 5/2007 | Kooyers et al. | 370/252 |
| 2007/0115849 A1* | 5/2007 | Ekelin et al. | 370/252 |
| 2009/0262657 A1* | 10/2009 | Ekelin et al. | 370/252 |
| 2010/0135178 A1* | 6/2010 | Aggarwal et al. | 370/252 |
| 2011/0128864 A1* | 6/2011 | Chan et al. | 370/252 |

OTHER PUBLICATIONS

Karn, et al., Improving Round-Trip Time Estimates in Reliable Transport Protocols, ACM Transactions on Computer Systems, vol. 9, No. 4, Nov. 1991, Pates 364-373 Sections 2 and 3.*

Fillon et al., Multi-Objective Genetic Programming for Improving the Performance of TCP, Proceedings of 10th European Conference on Genetic Programming, Apr. 2007, pp. 170 180 Section 2.*

* cited by examiner

SYSTEM AND METHOD FOR ESTIMATING ROUND-TRIP TIME IN TELECOMMUNICATION NETWORKS

FIELD OF THE INVENTION

This invention relates to round-trip time estimation in telecommunication networks, and more particularly to a system and method for estimating round-trip time in packet switched telecommunication networks.

BACKGROUND TO THE INVENTION

The Internet is increasingly being used for the transmission of high volumes of multimedia data generated from applications like video on demand, video telephony and videoconferencing. Reliable transmission of video over packet switched telecommunication networks such as the Internet requires stringent bandwidth demand as well as low delay and packet loss requirements. Currently, the Internet does not include any particular function in the network layer to support these requirements. Instead, the service quality functions are provided for at the application layer of the protocol stack or in the Transmission Control Protocol (TCP) found at the stack's transport layer.

TCP incorporates algorithms that are implemented on top of the network layer to control network congestion by adjusting the transmission rate based on the packet loss ratio and the round-trip time (RTT) experienced by data during transmission. To regulate network congestion it is therefore important to have an accurate estimation of the round-trip time. Other protocols that regulate real-time network traffic also make use of RTT estimates.

The round-trip time is the time interval that elapses between the sending of a packet and the receipt of its acknowledgement. Individual RTT samples can be obtained by a protocol that sends packets from the source to destination and tracks their delivery. Although it is fairly straightforward to design such a protocol, the accuracy of individual samples is not a very good representation of the actual RTT due to various noise sources such as the difference in synchronization between the sender's and the receiver's clocks. Rather than using the sampled value directly, most traffic controllers use a prediction of the future values, as the predicted values give better results than the sampled values.

Prediction of round-trip time is complicated by the noisy and nonlinear nature of the sampled values. Currently, TCP predicts future round trip times by sampling the behaviour of packets sent over a connection and averaging those samples into a "smoothed" round-trip time estimate value using a digital filter. The digital filter used in TCP belongs to the family of Fading Memory Polynomial (FMP) filters of degree zero. FMP filters produce an estimated value based on a weighted sequence of prior values and prior estimated values. FMP filters are not self-initialising, and accordingly the values predicted at the start-up of TCP connections are drastically affected by the initial input to the filter. The start-up transient behaviour of the TCP filter makes the initial estimates produced by the TCP filter inaccurate.

In K. Jacobsson, H. Hjalmarsson, N. Moller and K. H. Johanson, "*Round-Trip Time Estimation in Communication Networks Using Adaptive Kalman Filtering,*" *KTH—Royal Institute of Technology*, 2004, an adaptive Kalman filter is introduced with a Cumulative Sum (CUSUM) change detection scheme to detect sudden changes in the average RTT. Although the filter corrects the start-up problem of the TCP filter it introduces other challenges, such as the online determination of drift and the possibility of misdetection when a change on the average RTT occurs.

OBJECT OF THE INVENTION

It is an object of this invention to provide a system and a method for estimating round-trip time in telecommunication networks which is relatively simple and which at least partially alleviates some of the aforementioned disadvantages.

In this specification, the term "fading memory polynomial (FMP) filter" means any filter which takes as its input a series of samples with a constant sampling interval, and has an output that is a function of the most recent input sample weighted by a constant, and the samples preceding it weighted by successively smaller values. The term "expanding memory polynomial (EMP) filter" means any filter which takes as its input a series of samples with a constant sampling interval, and has an output that is based on fitting a polynomial of predetermined degree by least-square error to a certain number of the input samples. The term "composite polynomial filter" means a filter that includes both FMP and EMP filters; and the term "round trip time (RTT)" is the time interval that elapses between the sending of a data packet and the receipt of its acknowledgement

SUMMARY OF THE INVENTION

In accordance with the invention there is provided a method for estimating round-trip time (RTT) values for data packets travelling in a telecommunication network in which a sequence of RTT samples are obtained at periodic intervals, the method comprising: during a first time interval which begins with the start of a data transmission, generating the estimated RTT values by filtering the RTT samples with a self-initialising expanding memory polynomial (EMP) filter; and, after a first switch-over time at the end of the first time interval, generating the estimated RTT values by filtering the RTT samples with a fading memory polynomial (FMP) filter.

Further features of the invention provide for the FMP filter to run in the background during the first time interval and to produce an FMP estimation error which is the difference between an output of the FMP filter and the RTT samples; for the FMP estimation error to be continually compared with an EMP estimation error which is the difference between an output of the EMP filter and the RTT samples; and for the first switch-over time to be triggered when the FMP estimation error becomes equal to or less than the EMP estimation error.

Still further features of the invention provide for the EMP and FMP filters to be implemented in a single composite polynomial filter which has an EMP and FMP filter mode; for the filter modes to be implemented with a similar filter structure but different sets of filter weights; and for the composite polynomial filter to switch from the EMP mode to the FMP mode by changing the filter weights.

In accordance with a first aspect of the invention, after the switch-over time the RTT samples are filtered with the FMP filter for the remainder of the data transmission.

In accordance with a second aspect of the invention, the method includes continually comparing the FMP estimation error and the EMP estimation error during the remainder of the data transmission that follows the switch-over time, and adaptively switching from one filter to the other depending on which filter generates the lowest error.

In TCP applications an EMP and FMP filter of degree zero may be used. In other applications, for example where a network controller desires the estimated RTT values to more closely follow the RTT samples, EMP and FMP filters up to degree four may be used.

The invention extends to a system for estimating round-trip time (RTT) values for data packets travelling in a telecommunication network in which a sequence of RTT samples are obtained at periodic intervals, the system comprising a composite polynomial filter for generating the estimated RTT values by filtering the RTT samples, the composite polynomial filter having an expanding memory polynomial (EMP) filter mode and a fading memory polynomial (FMP) filter mode which can be alternately selected, wherein the EMP mode is selected during a first time interval which begins with the start of a data transmission and ends at a first switch-over time, and the FMP mode is selected at the first switch-over time.

Further features of the invention provide for the filter modes to be implemented by the same filter structure but with different sets of filter weights, so that the composite polynomial filter is operable to switch from the EMP filter mode to the FMP filter mode by changing the filter weights.

Still further features of the invention provide for the FMP filter mode to run in the background during the first time interval and be used to produce an FMP estimation error which is the difference between an output of the FMP filter mode and the RTT samples; for the FMP estimation error to be continually compared with an EMP estimation error which is the difference between an output of the EMP filter mode and the RTT samples; and for the first switch-over time to be triggered when the FMP estimation error becomes equal to or less than the EMP estimation error.

In one embodiment, after the first switch-over time, the estimated RTT values are generated by filtering the RTT samples with the FMP filter for the remainder of the data transmission. In a different embodiment, after the first switch-over time, the FMP estimation error and EMP estimation error are continually compared for the remainder of the data transmission, and the system is configured to adaptively switch between the FMP filter mode and EMP filter mode depending on which filter mode generates the lowest estimation error.

The system of the invention may have a composite polynomial filter of order zero and be used for RTT estimation in Transmission Control Protocol (TCP) applications.

DETAILED DESCRIPTION WITH REFERENCE TO THE DRAWINGS

Figure 1:
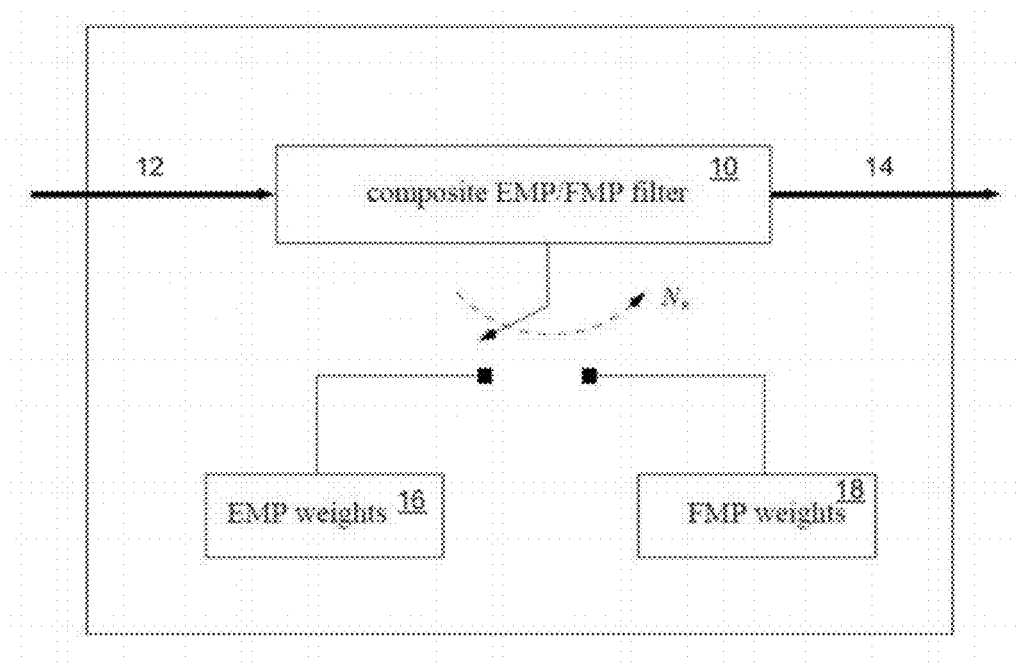
FIG. 1 is a schematic diagram of a composite polynomial filter used in the method and system of the invention.

In packet switched telecommunication networks such as the Internet, estimated round-trip times (RTTs) for data packets sent in the network are derived from a sequence of RTT samples obtained for data packets that are sent during a particular data transmission interval. The estimated RTT values are derived by digitally filtering the RTT samples.

The digital filters currently used for generating the estimated RTT values in the Transmission Control Protocol (TCP) used in the Internet are Fading Memory Polynomial (FMP) filters of degree zero, which will also be termed TOP filters. These TCP filters work by sampling the behaviour of packets sent over a connection and averaging those sequence of RTT samples into a "smoothed" RTT estimate, $\hat{x}$. When a packet is sent over a TCP connection the sender measures the time it takes for the packet to be acknowledged, producing a sequence ($x_n$, $n \geq 0$) of round trip time samples. Each new sample $x_n$ is used to produce a new estimated value $\hat{x}$ using the formula $$\hat{x}_{n+1} = \theta \hat{x}_n + (1-\theta) x_n \tag{1}$$

where $\hat{x}_n$ is the current estimate of the round-trip time, $\hat{x}_{n+1}$ is the new computed value and $\theta$ is a constant between 0 and 1 that controls how rapidly $\hat{x}$ adapts to changes in the RTT sample values, $x_n$.

At the start of a TCP connection the TCP filter must begin to generate estimated RTT values from the first RTT sample onwards. FMP filters such as the TCP filter have the drawback that they are not self-initialising. Because of this, the estimated RTT value. $\hat{x}$ is drastically affected by the initial input to the filter, making the initial estimate produced at the start of TCP connection inaccurate. The result is a slow start-up time observed with the existing TCP filter.

Expanding Memory Polynomial (EMP) filters operate by fitting a polynomial to sampled data by a least-squares process. For EMP filters of order zero, for example, a straight line is fitted to the sampled data. In EMP filters of higher order various other polynomials may be fitted to the sampled data. In EMP filters, all of the incorporated samples have an equal role in the determination of the estimate which makes EMP filters self-initialising.

Although EMP filters are self-initialising they are not suited to following arbitrary processes such as a sequence of RTT samples. If an $m^{th}$-degree EMP filter is smoothing data that comes from a process that is a polynomial of degree in or less, then the filter model will be perfectly matched to the process. However if the process is not a polynomial of degree m or less, then the EMP will initially track the process with acceptable error but later will develop unacceptably large errors. Because RTT samples follow an arbitrary process rather than polynomial curves, EMP filters develop unacceptably large errors when tracking the RTT samples.

With FMP filters, on the other hand, the least square procedure uses a fading memory which means that the most recent sample is weighted by one and the samples preceding it by successively smaller, exponentially decaying values. This makes FMP filters good at tracking any arbitrary process, but as previously mentioned they have the drawback of not being self-initialising.

In this invention, a composite polynomial filter is provided which combines the features of the FMP and EMP filters. The composite polynomial filter provides better initial estimates than the fading memory polynomial TCP filters, and also provides good tracking of the dynamic and non-linear behaviour of the RTT samples, leading to more accurate RTT estimation throughout the data transmission interval and consequent improvements in network congestion control.

The composite polynomial filter of the invention is a combination of an EMP and FMP filter both of the same degree. During a first time interval which begins at the start of a data transmission interval, an EMP filter mode is used to produce the estimated RTT values. In the background, an FMP filter mode is also monitored and the virtual estimation error produced by the FMP filter during the first time interval is compared with the actual estimation error produced by the EMP filter. During the first time interval, the error of the FMP filter will gradually decrease as more samples become available and the transient effects of initialisation diminish. As soon as the FMP filter shows the same error in its estimation as the EMP filter, the system switches over to use the FMP filter for further estimation of the RTT values.

It is possible to model the EMP and FMP filter modes as a mathematical model with the same structure differing only in their filter weights, so that the composite polynomial filter can switch between the EMP and FMP filters by simply changing the weights. FIG. 1 illustrates this in schematic form, in which the composite filter (10) filters a series of RTT samples (12) to produce estimated RTT values (14) as it output. At a data transmission start time, the composite filter (10) is set to use EMP weights (16) so that its properties of those of a self-initialising EMP filter. At some point the composite filter is then switched to an FMP mode in which it uses FMP weights (18), and its properties then become those of the FMP filter. In this way the composite filter gets the best performance from both filters, namely the self-initialising property of an EMP filter and the ability of an FMP filter to track any arbitrary process.

$N_s$ denotes the sample number at which the switchover from the EMP to FMP weights takes place. If $N_s$ is correctly selected then the move from EMP to FMP takes place seamlessly and without transients. To determine $N_s$, it is assumed that the EMP filter has been running from n=0, and also that a transient-free FMP filter has been running in the background. $N_s$ is selected such that the outputs of the foreground EMP and the background FMP contain similar errors.

It is possible to determine the value of $N_s$ based on the value of θ. Table 1 below gives a summary of $N_s$ for polynomial filters up to degree 4.

TABLE 1

Polynomial Degree vs Switching Number $N_s$

| Filter Degree | 1 | 2 | 3 | 4 |
|---|---|---|---|---|
| $N_s$ | $2(1^{-\theta})$ | $3.2(1^{-\theta})$ | $5.51(1^{-\theta})$ | $6.63(1^{-\theta})$ |

The methodology for deriving Table 1 is described in N. Morrison, Filter Engineering for Radar and Tracking: Gauss-Newton, Swerling, Kalman and Polynomial, http://www.rrsg.uct.ac.za/tracksmooth.tgz and will not be explained in detail herein.

RTT and Filter Models

As mentioned, it is possible to model the EMP and FMP filters as a mathematical model with the same structure, differing only in their filter weights.

The round-trip time x(t) is measured from a Packet Acknowledgement (ACK's) or Real-Time Control Protocol (RTCP) receiver report, resulting in a sequence $y_n$, where $y_n$ is the sequence of raw RTT samples that include delays caused by transient network effects such as sporadic crass-traffic. The short-lived duration of these transient effects means that their contribution to the RTT can be considered as noise from the point of view of congestion control and it is necessary to filter them out. The model of the sequence of RTT samples is then $$y_n = x_n + v_n \quad (2)$$

in which $v_n$ is the measurement noise. The model $y_n$ is then input to a 1-step polynomial filter, resulting in the following transposed vector $$\hat{Z}_{n+1,n} = (\hat{x}, \tau\dot{\hat{x}}, \tau^2/2!\,\ddot{\hat{x}}, \ldots \tau^m/m!D^m\hat{x})_{n+1,n}^T \quad (3)$$

where the first subscript in $\hat{Z}_{n+1,n}$ signifies that the validity instant of this state vector is $t_{n+1}$ and the second subscript signifies that $\hat{Z}$ is an output that was based on observations that were made up to and including time $t_n$. In equation 3 and the equations that follow, n indicates the most recent time (now), t is the time, $t_n$ the most recent time instant, m the degree of the fitting polynomial, and τ the constant sampling interval.

The vector $\hat{Z}$ having this structure is called the normalized vector and must be de-normalized in order to obtain the desired estimate $\hat{x}(t)$ of the process x(t). If $\hat{x}_{n+1,n} = (\hat{x}_{n+1,n}, \dot{\hat{x}}_{n+1,n}, \ddot{\hat{x}}_{n+1,n}, \ldots D^m\hat{x}_{n+1,n})$ is the state vector of the estimate, then the general de-normalization equation for the 1-step predictor is given by $$\hat{X}_{n+1,n} = D(\zeta)\hat{Z}_{n+1,n} \quad (4)$$

in which $D(\zeta)$ is a diagonal matrix whose elements are given by $$D(\zeta)_{i,i} = i!/\zeta^i \quad (5)$$

The basic structure of the 1-step-predictor EMP is illustrated using a third degree expanding memory polynomial $$e_n = y_n - \hat{z}_{0,n-1} \quad (6)$$

$$\hat{z}_{3_{n+1,n}} = \hat{z}_{3_{n,n-1}} + \delta e_n \quad (7)$$

$$\hat{z}_{2_{n+1,n}} = \hat{z}_{2_{n,n-1}} + 3\hat{z}_{3_{n+1,n}} + \gamma e_n \quad (8)$$

$$\hat{z}_{1_{n+1,n}} = \hat{z}_{1_{n,n-1}} + 2\hat{z}_{2_{n+1,n}} - 3\hat{z}_{3_{n+1,n}} + \beta e_n \quad (9)$$

$$\hat{z}_{0_{n+1,n}} = \hat{z}_{0_{n,n-1}} + \hat{z}_{1_{n+1,n}} - \hat{z}_{2_{n+1,n}} + \hat{z}_{3_{n+1,n}} + \alpha e_n \quad (10)$$

where $$\delta = \frac{140}{(n+4)(n+3)(n+2)(n+1)} \quad (11)$$

$$\gamma = \frac{120(2n+1)}{(n+4)(n+3)(n+2)(n+1)} \quad (12)$$

$$\beta = \frac{20(6n^2 + 6n + 5)}{(n+4)(n+3)(n+2)(n+1)} \quad (13)$$

$$\alpha = \frac{8(2n^3 + 3n^2 + 7n + 3)}{(n+4)(n+3)(n+2)(n+1)} \quad (14)$$

For maximum speed and to save on the required RAM, the algorithm is implemented in computer code as follows:

$$e = y - \hat{z}_0 \quad (15)$$

$$\hat{z}_3 = \hat{z}_3 + \delta e \quad (16)$$

$$\hat{z}_2 = \hat{z}_2 + 3\hat{z}_3 + \gamma e \quad (17)$$

$$\hat{z}_1 = \hat{z}_1 + 2\hat{z}_2 - 3\hat{z}_3 + \beta e \quad (18)$$

$$\hat{z}_0 = \hat{z}_0 + \hat{z}_1 - \hat{z}_2 + \hat{z}_3 + \alpha e \quad (19)$$

The 1-step-predictor FMP mode has precisely the same structure and there is no need to repeat its equations. The only difference between the EMP and FMP algorithms is the expressions that are used for the filter weights σ, γ, β, α; which for an FMP of degree 3 are set as follows:

$$\delta = \frac{1}{6}(1 - \theta) \qquad (20)$$

$$\gamma = (1 - \theta)^3(1 + \theta) \qquad (21)$$

$$\beta = \frac{1}{6}(1 - \theta)^2(11 + 14\theta + 11\theta^2) \qquad (22)$$

$$\alpha = 1 - \theta^4 \qquad (23)$$

Thus, it is possible to switch seamlessly from EMP to FMP mode by simply changing the weights, to create the composite EMP/FMP filter. The variable n does not appear in the FMP filter weights α, β, γ as it does in the EMP filter weights. Instead the FMP filter contains what is called the fading memory parameter$^\theta$. This is a real number selected by the user that lies in the range 0<θ<1 and controls the properties of the filter by controlling the exponential rate of decay of its memory.

Experimental Results

Figure 2:
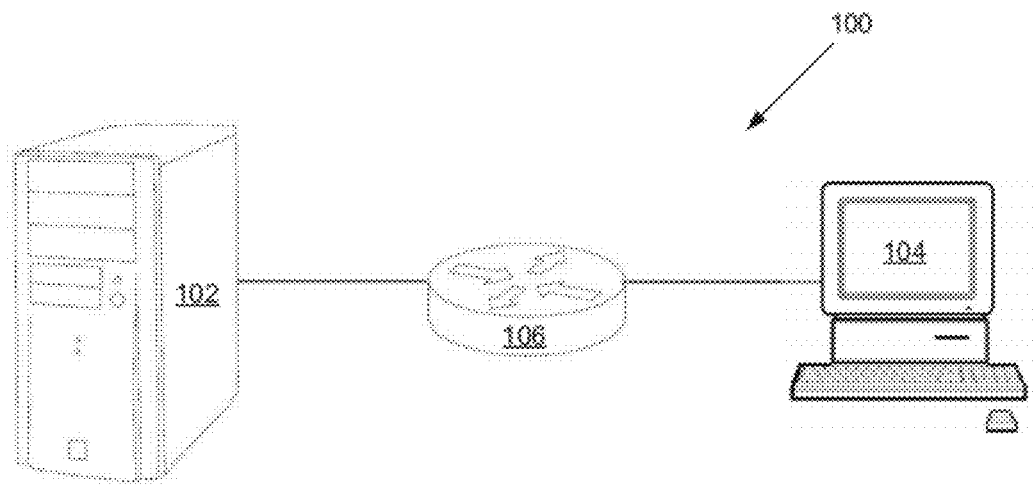
FIG. 2 is a schematic diagram of an experimental setup used in evaluating the composite polynomial filter of the invention.

FIG. 2 is a schematic diagram of an experimental setup (100) used in evaluating the composite filter of the invention. A LAN consisting of a multimedia server (102) and a multimedia client (104) was set up. Video content was stored at the server and transferred to the multimedia client through a router (106). The router also routed other kinds of traffic during busy times.

A simple experiment was conducted using the open source Live555 multimedia streaming library. To predict round-trip time, Live555 was extended to support the following three filters: a standard TCP (FMP) filter, a composite filter of the invention of degree-0 and a composite filter of the invention of degree-3. The value of θ was set equal to 0.9 for the TCP filter and the FMP part of the composite filter of degree-0, while θ=1/(n+1) for the EMP-component of the composite filter of degree-0. The composite filter of degree-3 was implemented as described previously with θ=0.9.

To facilitate extraction of the receiver report contents, Live555 was set to the debugging mode. Each time that a receiver report was to be generated, the receiver first computed the RTT and other network metrics as described in RFC3550. The computed value of RTT was then input into the three filters, to predict the next possible value of the RTT. The objective of the TCP and the composite filter of degree-0 was to predict the future value of the average RTT, whereas the purpose of the composite filter of degree-3 was to predict the actual value of the RTT.

Figure 3:
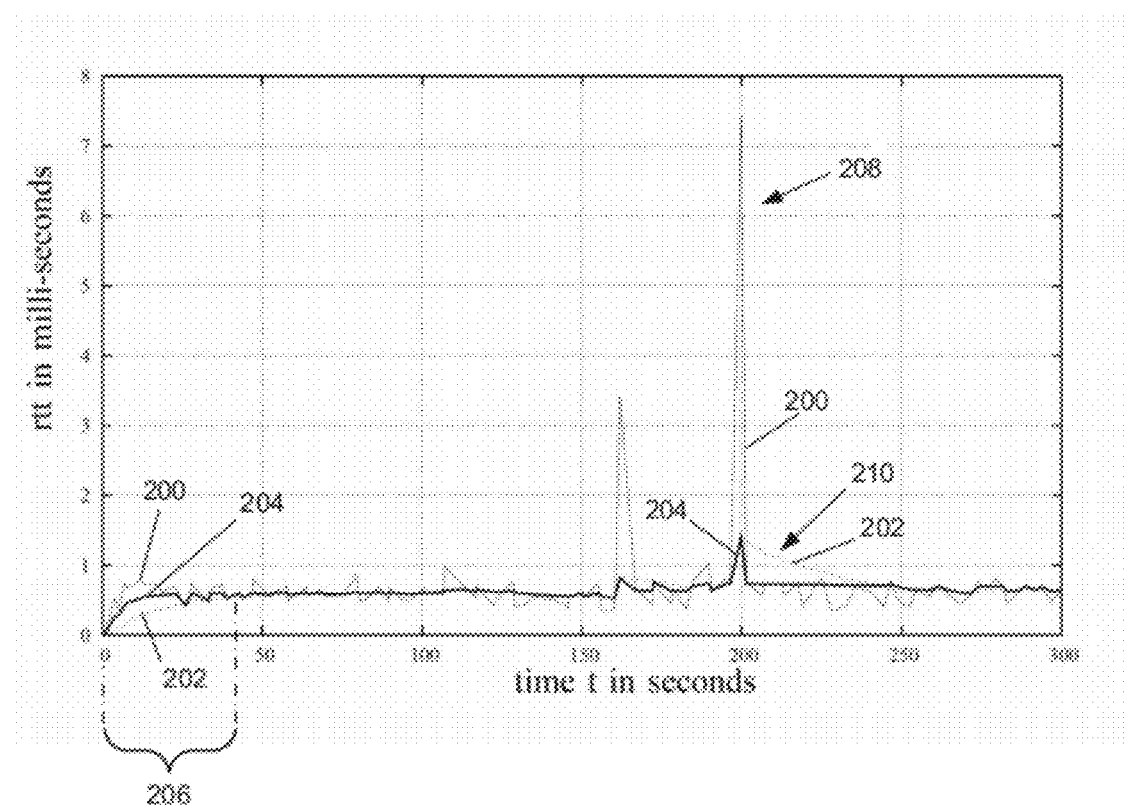
FIG. 3 is a graph showing measured RTT samples and estimated RTT values produced by a prior art TCP filter and the composite polynomial filter of the invention of order-0.

FIG. 3 is a graph showing the measured RTT samples (200) and the estimated RTT values produced by the TCP filter (202) and the composite filter of order-0 (204). The graph is shown over a data transmission interval of 300 seconds with a transmission start time at t=0 s and a start-up time interval (206) between t=0 s and t=35 s.

As seen from the broken line, the TCP filter (202) takes about 35 s to predict an acceptable value of the average RTT. The estimates during the start-up time interval are completely wrong; after t=35 s the TCP filter (202) shows an improvement on its predicted value. The composite EMP/FMP filter (204) of the invention, by contrast, shows a much better estimation during the start-up time interval (206). At t=35 s, the switch-over time at which the error of the FMP filter becomes equal to the error of the EMP filter, the composite EMP/FMP filter switches seamlessly from the EMP mode to the FMP mode. Its estimates are therefore identical to the TCP filter after t=35 s.

The following table compares some of the initial values of the composite filter and the TCP filter.

TABLE 2

Initial Values of the Composite EMP/FMP and TCP Filters when Estimating RTT

| k | $x_k$ | $x^*_{k,TCP}$ | $x^*_{k,EMP/FMP}$ | error$_{TCP}$ | error$_{EMP/FMP}$ |
|---|---|---|---|---|---|
| 1 | 0.00000 | 0.0000000 | 0.0000000 | 0 | 0 |
| 2 | 0.00052 | 0.0000519 | 0.0002594 | 0.0004671 | 0.000260 |
| 3 | 0.00037 | 0.0000833 | 0.0002950 | 0.0002827 | 7.1e−05 |
| 4 | 0.00076 | 0.0001513 | 0.0004120 | 0.0006117 | 0.0003510 |
| 5 | 0.00067 | 0.0002033 | 0.0004639 | 0.0004677 | 0.0002071 |
| 6 | 0.00078 | 0.0002608 | 0.0005163 | 0.0005172 | 0.0002617 |
| 7 | 0.00073 | 0.0003079 | 0.0005471 | 0.0004241 | 0.0001849 |
| 8 | 0.00073 | 0.0003504 | 0.0005703 | 0.0003816 | 0.000162 |
| 9 | 0.00061 | 0.0003764 | 0.0005748 | 0.0002336 | 3.525e−05 |

As can be seen in Table 2, the composite filter ($x^*_{k,EMP/FMP}$) provides much lower error rates during the initial samples as compared to the TCP filter.

In one embodiment of the invention, after the switch-over time the composite EMP/FMP filter remains in the FMP mode for the remainder of the data transmission interval and the EMP mode is only activated at the start of a new data transmission interval.

However, in an alternative embodiment of the invention, the composite filter continually compares the error of the FMP filter and the error of the EMP filter during the remainder of the data transmission interval and adaptively switches from one filter to the other depending on which generates the lowest error. The composite filter is thus able to switch not only from EMP to FMP but also back from FMP to EMP during the transmission interval. This embodiment is also illustrated in FIG. 3. As can be seen in FIG. 3, at about t=200 s a large spike (208) in the RTT samples is observed. Immediately after the spike, the error produced by the EMP mode of the composite filter (which was running in the background prior to t=200 s) becomes smaller than the error produced by the FMP mode. The composite filter (204) then switches back to the EMP mode between t=200 s and t=250 s after which the error produced by the passive FMP mode (now running in the background between t=200 s and t=250 s) becomes smaller than the error of the active EMP mode and the composite filter switches back to the FMP mode again.

It is clear from FIG. 3 that providing the ability to switch between filter modes during the data transmission interval provides the composite filter with the ability to recover quickly from sudden changes in the RTT sample values, whereas the TCP filter takes longer to recover, as demonstrated by the long tail (210) in the TCP filter output following the spike.

Figure 4A:
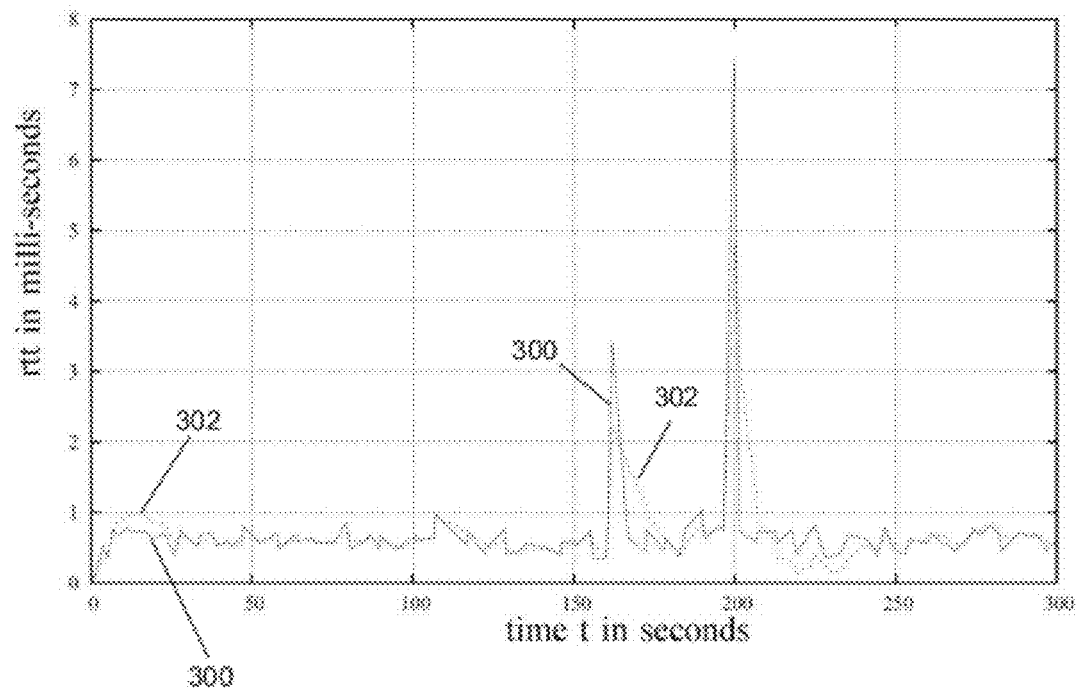
FIG. 4A is a graph showing measured RTT samples and estimated RTT values produced by a composite EMP/FMP filter of order-3.

Higher order composite filters were also tested. FIG. 4A is a graph showing measured RTT samples (300) and the estimated RTT values (302) produced by a composite EMP/FMP filter of order-3. In some applications a network controller may require the estimated RTT values to more closely follow the RTT samples than is the case with the composite filter of degree-0 and in such an instance a composite filter of degree-3 may be appropriate.

Figure 4B:
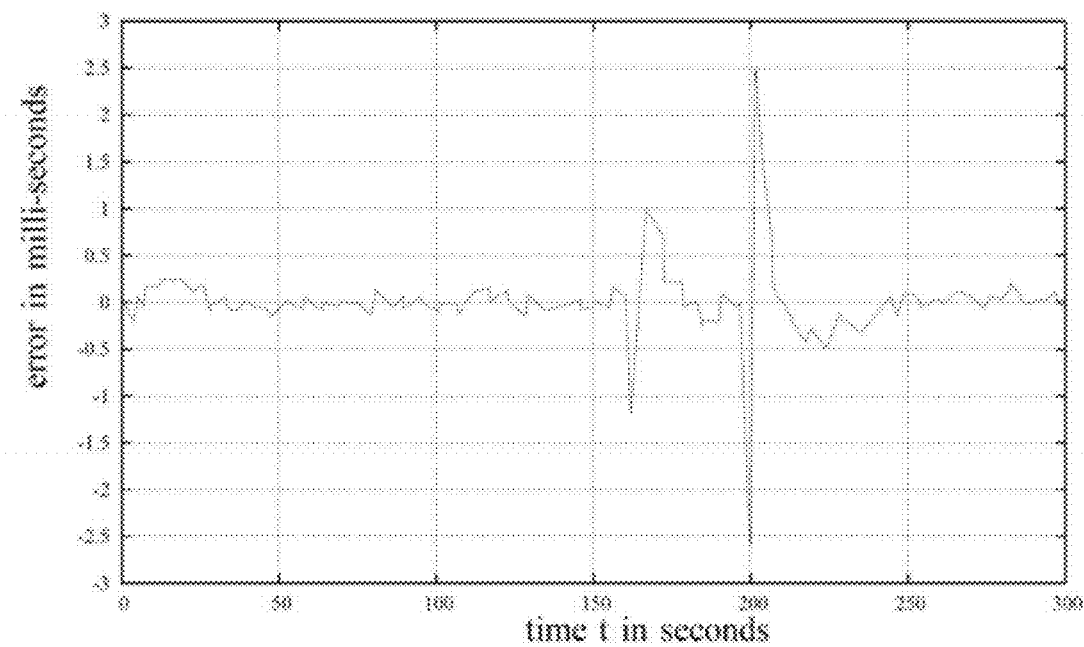
FIG. 4B is a graph showing the error in replacing the measured RTT samples by the estimated RTT values in FIG. 4A.

As seen in FIG. 4A, the higher-order composite filter follows the RTT samples more closely between t=50 s and t=150 s) than the composite filter of order-0 of FIG. 3. However, this is only the case in the absence of spikes. When spikes appear, the filter develops large errors. These errors are shown most clearly in FIG. 4B, which is a graph showing the error in replacing the measured RTT samples (300) by the estimated RTT values (302) in FIG. 4A. FIG. 4B clearly shows that large errors develop around the spikes at t=160 s and t=200 s. For most applications such as TCP it is envisaged that the composite polynomial filter of order-0 will be most appropriate, as it is able to cope well with large spikes. Both composite filters, however, display much better start-up performance than prior art TCP filters based on FMP only.

The invention therefore provides a method and a system for estimating round-trip time values in telecommunication networks which relies on a simple composite polynomial filter that provides improved start-up performance compared with existing TCP filters but does not suffer from the drawbacks associated with more complex adaptive Kalman filters. Improved round-trip time estimation allows efficient development of congestion control techniques for multimedia applications, leading to noticeable improvement in network congestion control.

It will be appreciated that the invention is not limited to the specific composite EMP/FMP filters disclosed, and that EMP and FMP filters of any order may be used in the composite filter of the invention. In particular, any means of switching between the EMP and FMP filters may be employed, and the filters need not be of equal order.

It will be appreciated that the invention is not limited to the specific composite EMP/FMP filters disclosed, and that EMP and FMP filters of any order may be used in the composite filter of the invention. In particular, any means of switching between the EMP and FMP filters may be employed, and the filters need not be of equal order.

The embodiments of the invention in which an exclusive property or privilege is claimed are defined as follows:

1. A method for estimating round-trip time (RTT) values for data packets travelling in a telecommunication network, the method comprising: sending a plurality of data packets over a telecommunication network and receiving an acknowledgement to at least some of the plurality of data packets; receiving a sequence of RTT samples at periodic intervals; during a first time interval which begins with the start of a data transmission, generating estimated RTT values by filtering the RTT samples with a self-initialising expanding memory polynomial (EMP) filter; and, after a first switch-over time at the end of the first time interval, generating the estimated RTT values by filtering the RTT samples with a fading memory polynomial (FMP) filter, wherein the EMP and FMP filters are implemented in a single composite polynomial filter which has an EMP filter mode and an FMP filter mode.

2. The method as claimed in claim 1 in which, during the first time interval: the FMP filter is run in the background and is used to produce an FMP estimation error which is the difference between an output of the FMP filter and the RTT samples; the FMP estimation error is continually compared with an EMP estimation error which is the difference between an output of the EMP filter and the RTT samples; and the first switch-over time is triggered when the FMP estimation error becomes equal to or less than the EMP estimation error.

3. The method as claimed in claim 2 in which, after the first switch-over time, the method includes continually comparing the FMP estimation error and EMP estimation error for the remainder of the data transmission, and adaptively switching between the two depending on which filter generates the lowest estimation error.

4. The method as claimed in claim 1 in which the filter modes are implemented by the same filter structure but with different sets of filter weights, so that the composite polynomial filter can be switched from the EMP filter mode to the FMP filter mode by changing the filter weights.

5. The method as claimed in claim 1 in which, after the first switch-over time, the estimated RTT values are generated by filtering the RTT samples with the FMP filter for the remainder of the data transmission.

6. The method as claimed in claim 1 in which the EMP filter and the FMP filter are selected to have the same polynomial order.

7. The method as claimed in claim 6 in which the polynomial order is less than or equal to four.

8. The method as claimed in claim 7 in which the polynomial order is zero and the method is used for RTT estimation in Transmission Control Protocol (TCP) applications.

9. A system for estimating round-trip time (RTT) values for data packets travelling in a telecommunication network in which a sequence of RTT samples are obtained at periodic intervals, the system comprising: a data packet transceiver for transmitting a plurality of data packets over a telecommunication network and receiving an acknowledgement to at least some of the plurality of data packets; and a composite polynomial filter for generating estimated RTT values by filtering the RTT samples, the composite polynomial filter having an expanding memory polynomial (EMP) filter mode and a fading memory polynomial (FMP) filter mode which can be alternately selected, wherein the EMP mode is self-initializing and is elected during a first time interval which begins with the start of a data transmission and ends at a first switch-over time, and the FMP mode is selected at the first switch-over time.

10. The system as claimed in claim 9 in which the filter modes are implemented by the same filter structure but with different sets of filter weights, so that the composite polynomial filter is operable to switch from the EMP filter mode to the FMP filter mode by changing the filter weights.

11. The system as claimed in claim 9 in which, during the first time interval: the FMP filter mode is run in the background and is used to produce an FMP estimation error which is the difference between an output of the FMP filter mode and the RTT samples; the FMP estimation error is continually compared with an EMP estimation error which is the difference between an output of the EMP filter mode and the RTT samples; and the first switch-over time is triggered when the FMP estimation error becomes equal to or less than the EMP estimation error.

12. The system as claimed in claim 11 in which, after the first switch-over time, the FMP estimation error and EMP estimation error are continually compared for the remainder of the data transmission, and the system is configured to adaptively switch between the FMP filter mode and EMP filter mode depending on which filter mode generates the lowest estimation error.

13. The system as claimed in claim 9 in which, after the first switch-over time, the estimated RTT values are generated by filtering the RTT samples with the FMP filter for the remainder of the data transmission.

14. The system as claimed in claim 9 in which the order of the composite polynomial filter is zero and the method is used for RTT estimation in Transmission Control Protocol (TCP) applications.

* * * * *